(No Model.)
J. SCHERMERHORN & T. JURY.
CULTIVATOR.
No. 378,377.  Patented Feb. 21, 1888.
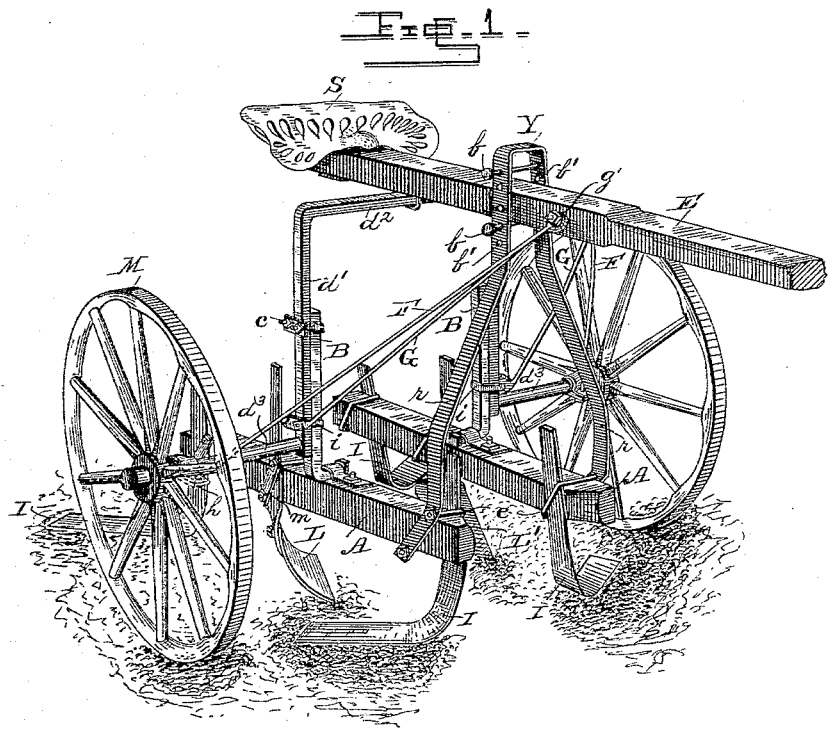
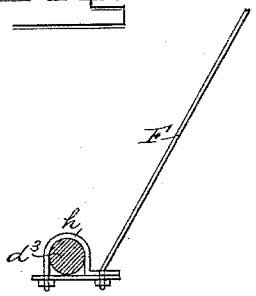
Witnesses:
Jos. H. Blackwood.
Inventors:
Joshua Schermerhorn
Theodore Jury.
by Wm. A. Doolittle Attorney.

UNITED STATES PATENT OFFICE.

JOSHUA SCHERMERHORN AND THEODORE JURY, OF TERRA COTTA, KANSAS.

CULTIVATOR.

SPECIFICATION forming part of Letters Patent No. 378,377, dated February 21, 1888.

Application filed November 17, 1887. Serial No. 255,425. (No model.)

*To all whom it may concern:*

Be it known that we, JOSHUA SCHERMERHORN and THEODORE JURY, citizens of the United States, residing at Terra Cotta, in the county of Ellsworth and State of Kansas, have invented certain new and useful Improvements in Cultivators; and we do hereby declare the following to be a full, clear, and exact description of the invention, such as will enable others skilled in the art to which it appertains to make and use the same.

Our invention relates to cultivators; and it consists in improvements in combined weed-cutter and cultivator, as more fully hereinafter described and particularly claimed.

Our invention is illustrated in the accompanying drawings, in which—

Figure 1 is a perspective view in elevation; Fig. 2, a detail.

A A are two beams, to the center of which are secured two upright standards, B B, and to these standards are secured, by means of clips $c$, a frame in one piece, composed of side vertical arms, $d'$, a top cross-piece, $d^2$, and bottom spindles, $d^3$, the latter forming axles for carrying-wheels W. To the top of the cross-piece $d^2$ is secured a tongue, E. The rear end of the tongue extends a short distance back of the top piece, $d^2$, and is provided with a seat, S.

Y is a yoke, the arms $r\ r$ of which are secured at their ends to the beams A by means of clips $e$. The top of the yoke straddles the tongue, and is confined thereon by bolts $b$ through holes $b'$ in the yoke, and by means of which the yoke can be raised or lowered.

F F G G are brace-rods to aid in supporting the tongue, the former secured to the axles by clips $h$, and the latter to the standards B and vertical arms $d'$ by clips $i$, and both the upper ends of the brace-rods F F G G are secured to the tongue by a set-screw, $g'$, these ends of the rods being provided with eyes through which the set-screw is passed.

I I I are weed-cutters consisting of long sharp blades terminating in upright shanks secured to each end of both the two beams by the clips $e$, and by means of which clips they can be adjusted to cut at any desired height through the sod or above it. The cutters are set at an angle, and their blades are turned from each other, so as to cut in front of and outside of the beams.

L L' are hoes or plows, each secured near the central part of each of the beams by clips $m$, and so set as to turn the soil from opposite directions up against the row.

The objects had in view in mounting the tongue and seat on the elevated frame are to furnish a support for the same at an elevation on a line with the necks of the team, or thereabout, whereby the draft and weight upon the team are greatly reduced and relieved and the line of draft made straighter, the weight of the driver and tongue being supported by the frame and arch, and, by reason of the pivotal brace-connection with the axle, the tongue while supported is also permitted to yield with the inequalities of the ground. At the same time strain and weight of the tongue are relieved from the team.

The weed cutters and hoes may be set and turned at any desired height to thoroughly cut and pulverize the soil.

What we claim is—

1. In combination with the carrying-wheels, the tongue, and the arched frame, the standards B, adjustable vertically on said frame, the yoke Y, having perforations, and the plow-beams, substantially as described.

2. In combination with the tongue, the yoke Y, straddling the tongue and provided with bolt-holes and bolts, and the beams, whereby the beams and weed-cutters are adjustable vertically, substantially as described.

In testimony whereof we affix our signatures in presence of two witnesses.

JOSHUA SCHERMERHORN.
THEODORE JURY.

Witnesses:
JOHN H. SHADE,
I. E. SCHERMERHORN.